Aug. 29, 1950     F. H. WUETIG     2,520,352
AUTOMATIC VARIABLE SPEED TRANSMISSION
Filed Oct. 16, 1946     2 Sheets—Sheet 1

INVENTOR
FRED H. WUETIG
BY
ATTORNEY

Aug. 29, 1950     F. H. WUETIG     2,520,352
AUTOMATIC VARIABLE SPEED TRANSMISSION
Filed Oct. 16, 1946     2 Sheets-Sheet 2

INVENTOR
FRED H. WUETIG
BY
ATTORNEY

Patented Aug. 29, 1950

2,520,352

UNITED STATES PATENT OFFICE 2,520,352

AUTOMATIC VARIABLE-SPEED TRANSMISSION

Fred H. Wuetig, Chicago, Ill.

Application October 16, 1946, Serial No. 703,508

14 Claims. (Cl. 74—337)

1

This invention is concerned with an automatic power and speed transmission disposed between a driving member and a driven member of a machine subjected to fluctuating loads. The transmission may be used, for example, for transmitting driving power from the driving shaft to the driven shaft of an automobile.

Among the principal objects of the invention are: (1) to provide a speed-changing transmission in which a substantially constant torque load is automatically maintained on the driving member in the presence of varying torque loads on the driven member; and (2) to provide a free-wheeling transmission in which the driven member may be selectively clutched to a low gear ratio driving gear by the actuation of the brake mechanism. The first noted feature furnishes automatically the proper gear ratio between the driving and driven members in accordance with the varying torque loads on the driven member, and the second feature is useful, e. g., in a motor vehicle, to keep the vehicle under the control of the engine and to employ its braking power so as to prevent it from gaining undesired speed when going downgrade.

These and additional objects and features will be brought out in the detailed description which will be presented below with reference to the accompanying drawings. In these drawings, Fig. 1 shows an embodiment of the new transmission diagrammatically in longitudinal vertical section taken approximately along lines 1—1 in Fig. 2;

Figure 1:
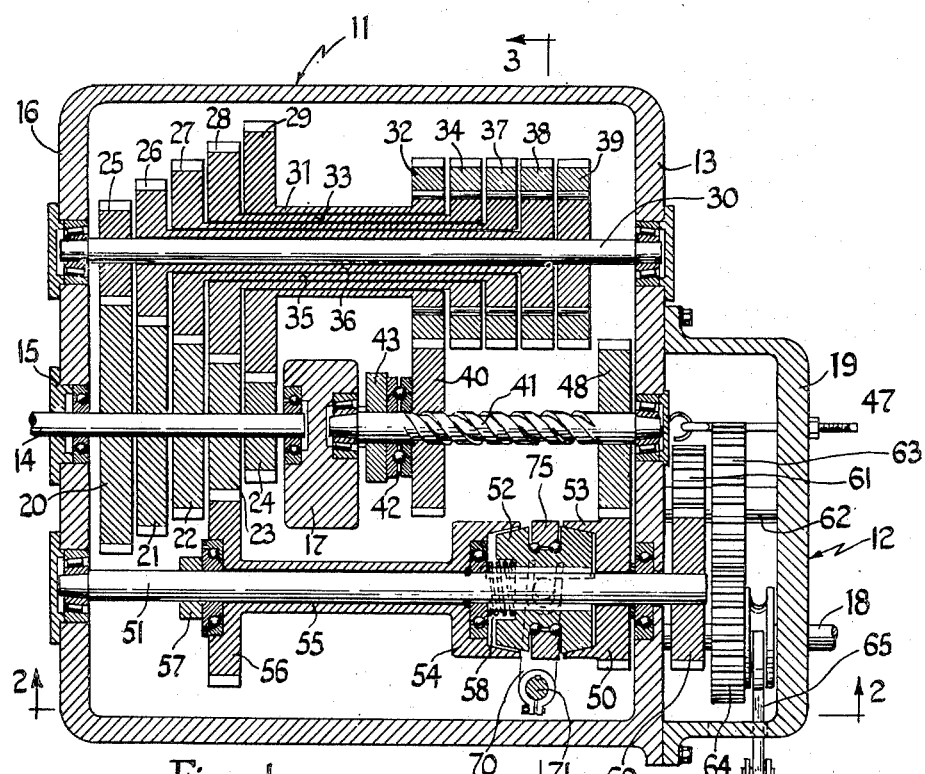

Known details and elements will be discussed only to the extent required for conveying an understanding of the invention. Like parts are indicated by like reference numerals throughout the drawings. It is assumed for convenience of description that the structure shown in the drawings is a transmission adapted for use in an automobile or the like.

Numeral 11 indicates generally a housing containing the principal transmission elements. Secured to this housing by suitable flanges and bolts is an auxiliary housing generally indicated at 12, containing reversing gears. A portion of the vertically extending end wall 13 of the transmission housing separates the reversing gears from the principal transmission elements. Suitable plugs for filling the housings with oil and for draining oil and sludge therefrom may be provided as desired.

The driving shaft 14, which is connected to the motor—if desired, through the medium of a suitable fly-wheel—enters the transmission housing 11 through a bushing 15 provided in the end wall 16. A bar-like mounting member 17 extends transversely through the transmission housing. The driving shaft 14 is rotatably mounted in bearings in the end wall 16 and in the transverse mounting member 17, as shown particularly in Fig. 1. The driven shaft 18 enters the structure through the end wall 19 of the auxiliary housing 12. It is journalled in suitable bearings provided in the end walls 19 and 13 of the auxiliary and the principal housings, respectively.

Keyed to the driving shaft 14 are a desired number of stepped gears, for example, five gears 20–24. These gears are the drive gears and always rotate with the driving shaft 14. They mesh with the driven countershaft gears 25–29; that is to say, drive gear 20 meshes with the countershaft gear 25 and the successively smaller drive gears 21–24 mesh, respectively, with the successively larger driven countershaft gears 26–29, as clearly shown in Fig. 1. The small driven countershaft gear 25 is keyed directly to the countershaft 30 which is rotatably journalled in bearings disposed in the end walls 16 and 13. Each of the remaining driven countershaft gears is provided with a tubular shaft or sleeve each of which carries at the opposite end its individual associated transmission gear wheel. The sleeves are in telescoping relation, one mounted rotatably on the other. Thus, as shown in Fig. 1, the driven countershaft gear 29 has its tubular sleeve 31 which carries at the other end the transmission gear wheel 32; the countershaft gear 28 has its tubular sleeve 33 which is provided at the other end with the transmission gear 34; the driven countershaft gears 27 and 26 likewise have their individual sleeves 35—36 which in turn carry the transmission gear wheels 37—38, respectively. Next to the gear wheel 38 is disposed another transmission gear wheel 39 which is keyed to the countershaft 30 just like the gear 25. It will thus be seen that all of the driven countershaft gears 25-29 rotate in response to the rotation of the driving shaft 14 and accordingly all of the transmission gear wheels 32, 34, 37, 38 and 39 rotate likewise each, however, at a different speed, depending on the gearing determined by the gear ratio between the corresponding stepped driving gears 20–24 and the associated driven countershaft gears 25–29.

Figure 3:
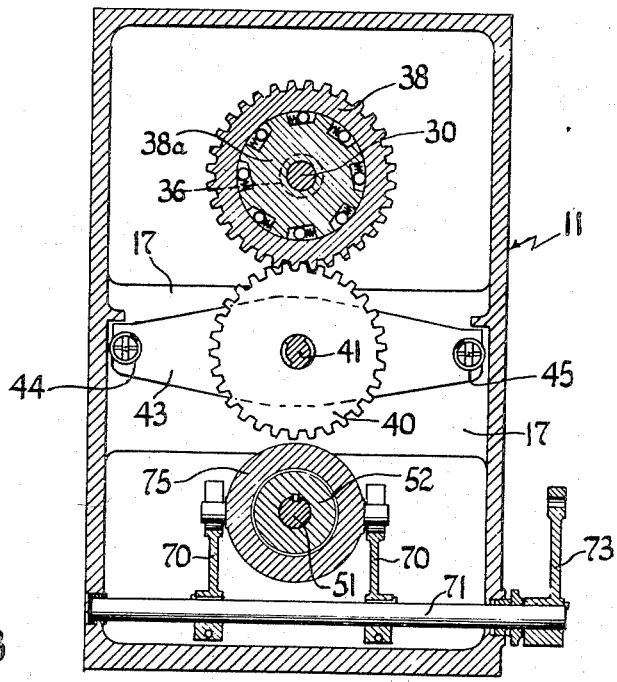
Fig. 3 represents a transverse vertical section taken approximately along lines 3—3 in Fig. 1.
Figure 4:
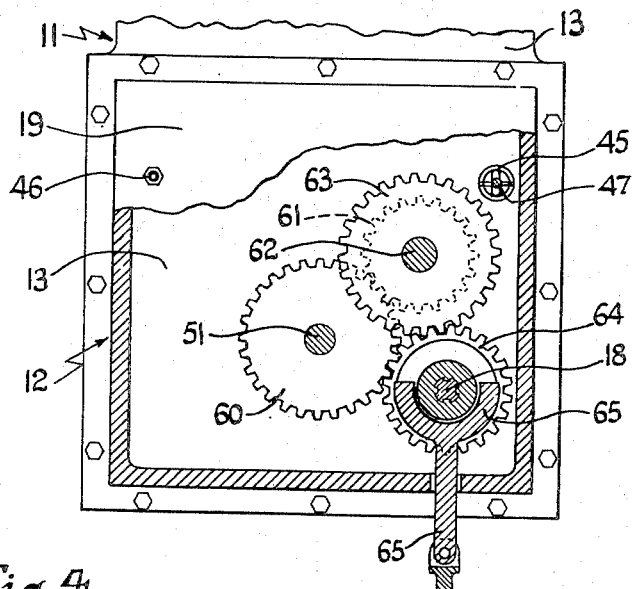
Fig. 4 illustrates a fractional section view taken approximately along lines 4—4 in Fig. 2.

Each of the transmission gear wheels 32, 34, 37, 38 and 39 comprises an annular inner member and an annular rim rotatably mounted thereon and carrying the gear teeth. The inner member is provided with inclined angular grooves each carrying elements such as a pawl and spring forming what is usually referred to as a silent ratchet. The arrangement is illustrated in Fig. 3 in connection with the transmission gear wheel 38. It will be seen that the wheel comprises the outer annular rim 38 provided with the gear teeth and the annular inner member 38a from which extends the tubular sleeve 36. The sleeve is rotatable on the shaft 30. The annular inner member is provided with a number of peripherally disposed angular grooves each containing the spring-biased pawl. The structure allows the wheel rim with its gear teeth to rotate independently of the annular inner member in the normal drive direction only. The arrangement prevents jamming of the transmission gears when two of them are engaged at any one time by the traveling gear 40. The operation will presently be explained more in detail.

The traveling gear 40 is internally threaded or provided with a spirally or helically extending groove, preferably in a suitable bushing associated with the gear 40, which is in engagement with the externally threaded or helically grooved intermediate driven shaft 41. This latter shaft is rotatably mounted at one end in a bearing provided in the bar-like mounting member 17 and at the other end in a bearing provided in the end wall 13 of the transmission housing. The traveling gear 40 can thus move longitudinally of the intermediate driven shaft 41 and can impart rotation to this shaft when rotated from any one of the transmission gear wheels 32, 34, 37, 38 and 39 which are driven at different speeds, as explained before. Thrust bearing 42 is slidably disposed on the intermediate shaft 41 and engages the traveling gear 40. The thrust bearing is in turn engaged by a yoke 43 which is slidable relative to the shaft 41 and extends transversely within the transmission housing. Suitable means may be provided for guiding the yoke in its motion with the thrust bearing axially of the shaft 41 and for preventing undesirable angular displacement thereof. Attached to each end of the yoke 43 is a spring as shown at 44 and 45, the other ends of these springs being associated with adjusting members 46 and 47, respectively. The tension of the springs 44—45 can be determined by suitable adjustment of the nuts at the free ends of the members 46—47, respectively. The traveling gear 40 is thus normally biased for gear engagement with the high speed transmission gear 39, and in normal, that is, in resting condition of the structure, the traveling gear 40 is in mesh with the gear 39. It is shown in mesh with the low speed transmission gear 32 only for convenience of description.

Keyed to the helically grooved intermediate driven shaft 41 is the intermediate gear marked by numeral 48. This last noted gear wheel is thus adapted to be driven at varying speeds, depending on the gear engagement of the traveling gear 40 with either one of the transmission gear wheels 32, 34, 37, 38 or 39. In the position in which the traveling gear 40 is shown, in mesh with gear wheel 32, it will rotate the helically grooved intermediate driven shaft 41 and therewith the intermediate gear wheel 48 at low speed determined by the gear ratio between the drive gear 24 and the driven countershaft gear 29. The traveling gear 40 assumes this position in the presence of a maximum torque load on the intermediate driven shaft 41. This maximum torque load in a motor vehicle is present, for example, when starting the vehicle.

Figure 2:
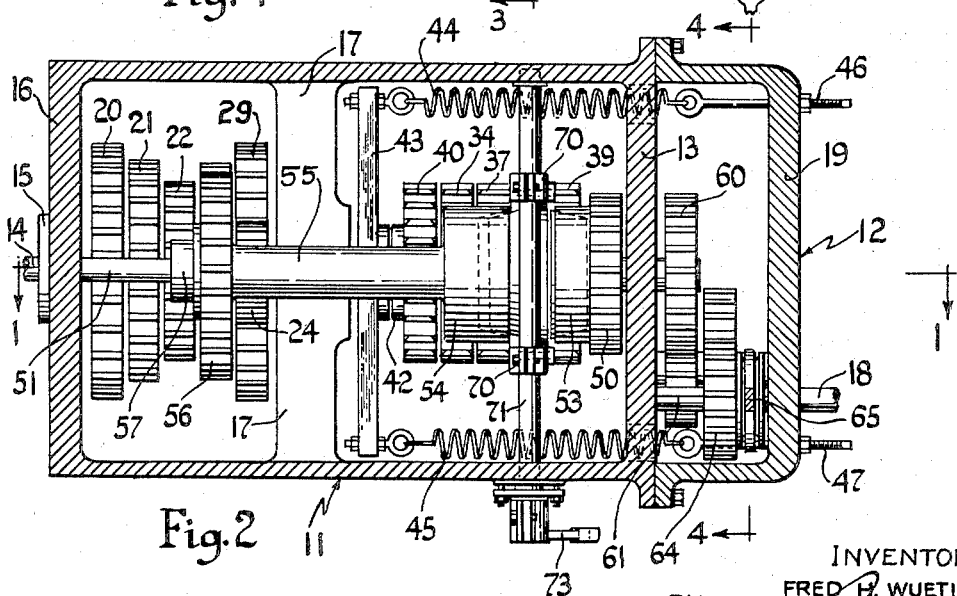
Fig. 2 is a transverse section taken approximately along lines 2—2 in Fig. 1.

The intermediate gear 48 is always in mesh with the clutch gear 50 which is rotatable on the auxiliary shaft 51. This shaft, in turn, is rotatably mounted in bearings provided in the end walls 16 and 13 of the transmission housing. Keyed to the auxiliary shaft 51, but longitudinally movable on it, is the clutch core 52. The clutch gear 50 is provided with an axially extending annular skirt 53 and into this skirt extends one side of the clutch core 52. On the other side of the clutch core, at the left as shown in Figs. 1 and 2, is provided a cup-shaped clutch member 54 having a tubular extension 55 which carries the gear wheel 56. The structure comprising the gear wheel 56, the sleeve 55 and the clutch member 54 is rotatable in bearings on the auxiliary shaft 51 and held in the normal position shown in Figs. 1 and 2 by the bushing 57 which is keyed to the shaft 51. Between the clutch core 52 and the cup-shaped member 54 is positioned a spring 58 holding the clutch core 52 normally in engagement with the skirt 53 which projects from the clutch gear 50. Therefore, when the intermediate gear 48 rotates (being driven by the rotation of the helically grooved intermediate driven shaft 41) it will rotate the clutch gear 50 and therewith the clutch core 52. The clutch core, being keyed and splined on the auxiliary shaft 51, will rotate this shaft. The gear 56, being in mesh with the low gear ratio drive gear 23 on the driving shaft 14, will idle, having no function at the present moment, and will of course also rotate the tubular sleeve 55 and the cup-shaped clutch member 54. The latter is disengaged from the clutch core 52 and is thus free to rotate.

The auxiliary shaft 51 projects through the end wall 13 of the transmission housing into the auxiliary housing 12 and carries at its free end, within the auxiliary housing a gear 60 which is keyed to it. This gear wheel is always in mesh with a gear 61 which is keyed to the shaft 62 to which is also keyed a larger gear 63. The driven shaft 18 extends into the auxiliary housing 12, being journalled in bearings in the end wall 19 and the end wall 13 of the transmission housing, respectively, as previously explained. It carries a gear wheel 64 splined to it for longitudinal displacement thereon. The gear 64 is normally in mesh with the gear 63 and the driven shaft 18 is thus rotated in the forward direction of the vehicle. The gear 64 may be longitudinally displaced on the driven shaft out of mesh with the gear 63 and into mesh directly with the gear 60, thus reversing the direction of rotation of the driven shaft 18. The gear 64 is longitudinally moved on the driven shaft for reversing purposes by any suitable means, for example, by the movable fork arrangement shown and indicated by numeral 65.

It has been assumed that the transmission is used in a motor vehicle. There is a suitable clutch (not shown) adapted to disengage the transmission from the motor. This clutch is actuated upon starting the vehicle from a dead stop. The traveling gear 40 is at this moment in mesh with the transmission gear 39 which rotates at high speed. There is a maximum torque load on the shaft 18 which is propagated to the helically grooved intermediate driven shaft 41 from the driven shaft 18 through the gears 64, 63, 61, 60, clutch core 52, clutch gear 50 and intermediate gear 48. This maximum torque load on the driven shaft 18, now being manifest on the intermediate driven shaft 41, overcomes the pull of the springs 44—45 and the traveling gear 40 moves from its initial position successively from gear engagement with the transmission gear wheel 39 into mesh with the transmission gear wheels 38, 37, 34, and finally 32, thereby tensioning the springs 44—45 through the medium of the yoke 43 which presses on the thrust bearing 42, the latter engaging the traveling gear 40. The maximum torque load on the driven shaft 18 is now overcome by transmitting driving power to the driven shaft from the low gear 24 on the driving shaft 14, driven countershaft gear 29, and associated transmission gear wheel 32. The torque load on the driven shaft 18 decreases as the vehicle gains speed and the tension of the springs 44—45 can exert itself, successively moving the traveling gear 40 from the position shown in Figs. 1 and 2 to the right successively into gear engagement with the transmission gears 34, 37, 38, and 39 in accordance with the successive decrease in the torque load on the driven shaft. Finally, the traveling gear 40 transmits power to the driven shaft directly from the high speed transmission gear wheel 39 which is keyed to the countershaft 30, the high gear ratio being determined by the gearing between the driven countershaft gear 25, also keyed to the shaft 30, and the drive gear 20 on the driving shaft 14.

The successive gear engagement of the traveling gear 40 with the transmission gear wheels 32, 34, 37, 38 and 39, is facilitated by suitably beveling or mitering the teeth of the transmission gear wheels 32, 34, 37, 38 and 39 and also the teeth of the traveling gear 40, as indicated in Fig. 2, and by the silent ratchet mechanism, previously described in connection with the gear wheel 38, which permits idling rotation of each transmission gear wheel independent of its annular inner member which, in the case of gear wheel 39, is directly keyed to shaft 30, and in the case of gear wheels 38, 37, 34 and 32 is provided with its corresponding associated sleeve. The motion of the traveling gear 40 on the shaft 41 and transfer thereof relative to the transmission gears 32, 34, 37, 38 and 39, in either direction of motion is thus effected without jamming.

The structure always provides, in this manner, for the proper gear ratio in accordance with the torque load on the driven shaft. The gear ratio is increased or decreased as may be necessary.

The helix angle of the thread or helical groove on the intermediate driven shaft 41 should be such that the lateral component of the rotating force will cause sufficient tensioning of the springs 44—45. The tension of these springs is adjustable by the nuts coacting with the pins or bolts 46—47. Helical or spur gears may be used, but the combination of the helix angle of the gears and that of the helical groove on the intermediate shaft must be sufficient to keep the springs under required tension.

The structure provides for an inherent freewheeling feature in which the highest gear ratio is delivered in the presence of the smallest torque load on the driven shaft. When going downgrade, the vehicle gains speed and it is desirable, during such contingency, to take advantage of the braking power of the motor, that is, to clutch the driven shaft 18 positively to a drive gear. This is accomplished by the provision of the clutch core 52 which may be operated by the usual brake mechanism through the arms 70 carried on the shaft 71 which is actuated by the lever 73 from the brake mechanism. The arms 70 actuate the slip ring 75 which is journalled on a suitable bearing provided in a center groove of the clutch core 52. The clutch core is thus moved out of engagement with the skirt 53 projecting from the clutch gear 50, thus disconnecting the driven shaft from driving connection with the intermediate driven shaft 41. The other side of the clutch core 52 is at the same time brought into engagement with the cup-like member 54 and, inasmuch as the clutch core is splined, that is to say, keyed to the shaft 51, this shaft will now be under the control of the low ratio drive gear 23 which is in mesh with gear 56. The breaking power of the motor is thus propagated through the auxiliary shaft 51, gears 60, 61, 63 and 64 to the driven shaft 18. The transmission gears as well as the traveling gear 40, intermediate gear 48 and clutch gear 50 idle during the brake operation of the clutch core.

Five stepped gears 20 to 24 have been shown on the driving shaft 14 and associated with a like number of countershaft gears 25 to 29. The number of gears shown does not indicate any inherent limitation. Fewer such gears may be employed where possible, and a greater number may be used if desired or necessary.

The intermediate driven shaft 41 may be provided with straight spline grooves when using helical gears for the traveling gear 40 and for its associated transmission gear wheels on the countershaft.

Other changes may be made within the scope and spirit of the appended claims which define what is believed to be new and desired to have protected by United States Letters Patent.

I claim:

1. In a variable speed-changing device of the class described, an engine-driven driving shaft carrying a set of stepped driving gear wheels, a rotatable countershaft, a plurality of coaxial sleeves rotatably mounted on said countershaft, each sleeve carrying a gear wheel at each end thereof, the gear wheels at one end of said sleeves forming a set of stepped driven gears of different diameters which are in driving engagement with corresponding stepped driving gear wheels carried by said driving shaft and the gear wheels at the opposite ends of said sleeves forming a set of transmission gear wheels of identical diameter, whereby said transmission gear wheels are rotated at different speeds responsive to rotation of said engine-driven driving shaft, an intermediate shaft disposed in parallel with said countershaft, and a traveling gear carried by said intermediate shaft for selective gear engagement with any one of said transmission gear wheels.

2. The structure and combination defined in claim 1, together with gear wheels keyed to said countershaft forming part of said sets of stepped and transmission gears, respectively.

3. The structure and combination defined in claim 1, together with overrunning means for each of said transmission gear wheels to enable rotation thereof independent of the sleeve associated therewith.

4. The structure and combination defined in claim 1, together with means for rotatably mounting said intermediate shaft, and means for rotatably mounting said traveling gear on said intermediate shaft.

5. The structure and combination defined in claim 1, together with means for resiliently biasing said traveling gear on said intermediate shaft for axial displacement relative to said transmission gears, an auxiliary driven shaft, and coacting gear means carried by said intermediate shaft and said auxiliary driven shaft, respectively, for rotating said auxiliary driven shaft responsive to rotation of said traveling gear.

6. The structure and combination defined in claim 1, together with means for constantly maintaining a torque load on said intermediate shaft.

7. The structure and combination defined in claim 1, together with means for rotatably mounting said intermediate shaft, means including said traveling gear for constantly maintaining a torque load on said intermediate shaft, a driven shaft subject to variable torque loads, and gear means between said driven shaft and said intermediate shaft, the momentary torque load on said driven shaft counteracting the torque load constantly maintained on said intermediate shaft.

8. A variable speed gear mechanism comprising a plurality of identical transmission gears placed side by side on a common shaft, a plurality of driving gears for rotating said transmission gears at different speeds, an intermediate shaft disposed in parallel with the shaft of said transmission gears, a traveling gear splined on said intermediate shaft for longitudinal displacement thereon to permit driving engagement thereof with any one of said transmission gears, a fixed gear on said intermediate shaft, an auxiliary shaft, a floating gear on said auxiliary shaft which is in gear engagement with said fixed gear, a clutch member splined on said auxiliary shaft for connecting such shaft in driving engagement with said fixed gear, a driven shaft, means for connecting said driven shaft with said auxiliary shaft, and means including said clutch member for connecting said auxiliary shaft in direct driving engagement with a predetermined driving gear.

9. An automatic speed transmission for use with an engine vehicle comprising a set of motor-driven stepped gears, a set of identical transmission gears driven by said stepped gears at different speeds, an intermediate shaft carrying a screw thread, a traveling gear carrying an internal screw thread for engagement with the screw-thread on said intermediate shaft whereby said traveling gear is movable on said intermediate shaft longitudinally thereof for selective driving engagement with any one of said transmission gears, biasing means tending to move said traveling gear on said intermediate shaft longitudinally thereof, to maintain constantly a torque load thereon, a driven shaft, subject to variable torque loads and gear means for transmitting power from said intermediate shaft to said driven shaft, the difference between the opposing torque loads exerted on said intermediate shaft by said biasing means and the torque loads on said driven shaft causing the longitudinal displacement of said traveling gear on said intermediate shaft and selective gear engagement thereof with said transmission gears.

10. An auxiliary speed transmission for use with a motor vehicle comprising a set of engine-driven stepped gears, a set of identical transmission gears driven by said stepped gears at different speeds, an intermediate shaft carrying a screw thread, a traveling gear carrying an internal screw thread for engagement with the screw thread on said intermediate shaft whereby said traveling gear is movable on said intermediate shaft longitudinally thereof for selective driving engagement with any one of said transmission gears, means tending to move said traveling gear on said intermediate shaft longitudinally thereof, a driven shaft subject to variable torque loads, and means for transmitting power from said intermediate shaft to said driven shaft comprising an auxiliary shaft, gear means connecting said auxiliary shaft with said driven shaft, gear means connecting said auxiliary shaft with a predetermined engine driven stepped gear, and clutch means for selectively connecting said auxiliary shaft in driving engagement with said intermediate shaft or with a predetermined engine-driven stepped gear.

11. The structure and combination defined in claim 10, together with means associated with said driven shaft forming a reversing gear therefor.

12. In a speed change mechanism, a plurality of coaxial tubular sleeves rotatably disposed on a common rotatable shaft, each sleeve carrying an identical transmission gear wheel, said wheels being placed side by side, driving means for rotating said sleeves and therewith said transmission gear wheels at different speeds, a rotatable intermediate shaft disposed in parallel with the common shaft carrying said sleeves and said transmission gear wheels, a traveling gear splined to said intermediate shaft for rotation therewith and for axial displacement thereon to effect gear engagement with any one of said transmission gear wheels whereby said intermediate shaft may be rotated at different speeds, an auxiliary shaft rotatably disposed in parallel with said intermediate shaft, gear means for connecting said intermediate shaft with said auxiliary shaft, a driven shaft, and gear means rotated by said auxiliary shaft for rotating said driven shaft.

13. The structure and combination defined in claim 12, wherein said driven shaft is subject to variable torque loads, and means for resiliently biasing said traveling gear on said intermediate shaft axially thereof to maintain it normally in gear engagement with the transmission gear wheel which is rotated by said driving means at highest speed, said biasing means producing a predetermined torque load on said intermediate shaft which is counteracted by the momentary variable torque loads on said driven shaft to cause longitudinal displacement of said traveling gear so as to effect gear engagement thereof with a transmission gear rotating at a speed which is adapted to overcome the momentary torque load on the driven shaft.

14. A variable speed gear mechanism comprising a plurality of identical transmission gear placed side by side on a common rotatable shaft, driving means for rotating said transmission gears at different speeds, an intermediate shaft carrying a screw thread disposed in parallel with the shaft of said transmission gears, a traveling gear carrying an internal screw thread for engagement with the screw thread on said intermediate shaft whereby said traveling gear is axially movable thereon to permit selective gear engagement thereof with any one of said transmission gears, means for resiliently axially biasing said traveling gear to maintain constantly a torque load on said intermediate shaft, a fixed gear on said intermediate shaft, an auxiliary shaft, a floating gear on said auxiliary shaft which is in gear engagement with said fixed gear, a clutch member splined on said auxiliary shaft for connecting such shaft in driving engagement with said floating gear, a driven shaft, means for connecting said driven shaft with said auxiliary shaft, said driven shaft being subject to variable torque loads, the difference between the opposing torque loads exerted by said biasing means on said intermediate shaft and the torque loads on said driven shaft causing said traveling gear to move selectively into driving engagement with said identical transmission gears.

FRED H. WUETIG.

REFERENCES CITED

The following references are of record in the file of this patent:

UNITED STATES PATENTS

| Number | Name | Date |
|---|---|---|
| 1,054,346 | Hall | Feb. 25, 1913 |
| 1,141,295 | Wright | June 1, 1915 |
| 1,145,236 | Fay | July 6, 1915 |
| 1,472,263 | Appleberg | Oct. 30, 1923 |
| 1,965,709 | Morse | July 10, 1934 |
| 1,977,310 | Kanolt | Oct. 16, 1934 |
| 1,979,080 | Roeder | Oct. 30, 1934 |
| 2,045,835 | Coen | June 30, 1936 |
| 2,107,422 | Moross | Feb. 8, 1938 |
| 2,311,740 | Dodge | Feb. 23, 1943 |
| 2,320,757 | Sinclair | June 1, 1943 |

FOREIGN PATENTS

| Number | Country | Date |
|---|---|---|
| 340,136 | Great Britain | Dec. 24, 1930 |